United States Patent [19]

Asar Madhu P. et al.

[11] 4,317,695

[45] Mar. 2, 1982

[54] TAPING APPARATUS WITH DUAL TAPE APPLICATOR MECHANISMS

[75] Inventors: Asar Madhu P., Reynoldsburg; Richard A. Greene, Pickerington, both of Ohio

[73] Assignee: Western Electric Company, Incorporated, New York, N.Y.

[21] Appl. No.: 210,703

[22] Filed: Nov. 26, 1980

[51] Int. Cl.[3] .............................................. B32B 31/00

[52] U.S. Cl. .................................... 156/353; 156/264; 156/361; 156/519; 156/520

[58] Field of Search ................ 156/353, 361, 519-522, 156/505, 506, 264; 83/623, 600, 566, 51

[56] References Cited

U.S. PATENT DOCUMENTS

| | | | |
|---|---|---|---|
| 3,117,051 | 1/1964 | Kornblum | 156/506 |
| 3,772,120 | 11/1973 | Radyins | 156/521 X |
| 3,880,699 | 4/1975 | Nishimoto | 156/505 |
| 3,960,641 | 6/1976 | Pedersen | 156/519 |

OTHER PUBLICATIONS

"Model No. S-625 Tape Applicator Mechanism", 3M Data sheets, no date.

*Primary Examiner*—David A. Simmons
*Attorney, Agent, or Firm*—K. R. Bergum

[57] ABSTRACT

A taping apparatus (10) is disclosed for applying a spaced array of transversely oriented material strips, such as in the form of plastic tapes (36), on each side of indexably advanced strip stock, such as in the form of a thin plastic film (12), during each dwell period of the latter, with corresponding tapes on opposite sides of the film being precisely aligned in pairs. The apparatus includes a film advancing assembly (13, 14, 16, 22, 24, 32), two mutually disposed tape applicator mechanisms (28, 29), a specially constructed platen assembly (26), mounted on a longitudinally disposed U-shaped support bed (27), and a control circuit (33). In order to provide the necessary solid backing for each of the tape applicator mechanisms (28, 29) when sequentially actuated, the platen assembly (26) includes a platen (90) formed with two longitudinally offset segments (91, 92) positioned at different elevations so as to define a film-receiving passageway (94) therebetween. The platen segments are retractably mounted on the support bed (27) such that they define film-guiding extensions of the bed across an opening (**27*b*) formed therein. As thus constructed, and mounted, the platen segments (91, 92) can be rapidly positioned, in succession, into alignment with the respectively associated opposite film-side tape applicator mechanisms (28, 29). This advantageously allows two precisely aligned tapes (36) to be successively and respectively secured to opposite sides of the film (12**) during each dwell period thereof.

20 Claims, 8 Drawing Figures

TAPING APPARATUS WITH DUAL TAPE APPLICATOR MECHANISMS

BACKGROUND OF THE INVENTION (1) Field of the Invention

This invention relates to a taping apparatus and, more particularly, to such an apparatus which employs dual tape applicator mechanisms for applying different ones of a pair of tapes in precise alignment on opposite sides of, and at predetermined spaced intervals along, a supply of indexably advanced strip stock, such as in the form of plastic film.

(2) Background of the Invention

In the manufacture of one particular type of flat cable, two precisely offset arrays of rectangularly shaped conductors are separated by a center film, with each array being bonded only to the respectively adjacent one of two mutually disposed adhesive-coated outer films. Prior to laminating the conductors between the center and outer films, a separate narrow insulative tape, such as of polyester plastic, is positioned transversely across, and at least lightly bonded to, each side of the center film at each of a spaced array of predetermined terminating sites along the subsequently fabricated cable, such as at intervals on the order of 5, 10 or 15 feet. With these tapes being chosen to be of a material that does not adhere to either the adjacent conductors or adhesive-coated outer films, they advantageously allow the respective portions of the conductors coextensive therewith to be readily separated from the center film. This greatly facilitates the subsequent connectorization of the cable at such terminating sites.

In view of the function of such tapes, it becomes readily apparent that each corresponding pair thereof must normally be precisely aligned on opposite sides of the center film. This is particularly imperative when the tapes are initially of relatively narrow width (e.g., on the order of ½ to 1" in width), and when each pair of tapes, as secured to the film, and incorporated in a fabricated cable, are laterally bisected so as to provide both leading end and trailing end pairs thereof. Each such bisected tape is thus seen to be of only one-half its original width. For further details relating to the features and advantages of such a uniquely constructed cable, attention is directed to a co-pending application of W. A. Elliott and T. J. Taylor, Ser. No. 106,599, filed Dec. 26, 1978, and assigned to the same assignee as the present invention.

When utilizing a conventional automated tape applicator mechanism of the type of primary concern herein for taping the surfaces of articles, such as plastic films, which inherently have no rigidity, a solid backing, or platen, is required to support the film on the side thereof opposite the taping mechanism. This has presented a number of problems heretofore with respect to applying transversely oriented tapes on opposite sides of indexably advanced film in not only precisely aligned pairs, but in a rapid manner.

Considered more specifically, tape applicator mechanisms of the type in question cannot practically, and certainly not reliably, function as a platen for a corresponding, opposite film-side mechanism in alignment therewith, whether such mechanisms would be actuated simultaneously, or alternately. As such, different techniques have been used or proposed heretofore to effect a film-taping operation of the type of primary concern herein. One such technique has involved the utilization of a single tape applicator mechanism for applying a first spaced array of transversely oriented tapes on one side of an indexably advanced film, with the latter thereafter either being twisted 180°, or the relative positions of the supply and take-up reels being reversed, or both, so that upon the film again being advanced past the single applicator mechanism a second array of tapes will be applied to the opposite side of the film. This is not only a time-consuming and costly fabrication process but, more importantly, makes it almost impossible, regardless of the degree of control attainable over tape advancement, to insure that the film will always be stopped at the same corresponding points on opposite sides thereof during the two independent taping operations so as to achieve consistently reliable registration of the tapes, in pairs. Further compounding the problem in this regard is the fact that many films or webs, particularly when of thin plastic material, have a tendency to stretch non-uniformly by at least small amounts in being indexably advanced between two spaced points.

It has also been appreciated heretofore that two tape applicator mechanisms of the type in question could be positioned on opposite sides of, and staggered (i.e., offset) longitudinally along an indexably advanced film, such that respectively associated, and permanently positioned, platens could be aligned with each applicator mechanism on the side of the film opposite thereto. With such an arrangement, it is appreciated that the film would have to be stopped at each of the two longitudinally spaced stations in order to effect the securement of opposite side pairs of tapes to the film in hopefully aligned registration. Such a double-stop taping technique, as in the case with the aforementioned dual-pass taping technique utilizing a single-applicator mechanism, is seen to require separate film advancement dwell periods in order to apply each aligned pair of tapes to the film. This not only places what may often be undesirable limits on the time required to complete a given taping operation, but also poses serious problems in achieving consistently precise control over top side-bottom side tape registration, regardless of the chosen speed for film advancement.

SUMMARY OF THE INVENTION

It, therefore, is an object of the present invention to provide a simplified, inexpensive and reliable apparatus for applying a spaced array of transversely oriented material strips, such as in the form of plastic tapes, on each side of a rapidly indexed supply of strip stock, such as in the form of plastic film, during each dwell period of the advanced film, and with corresponding tapes on opposite sides of the film being precisely aligned, in pairs.

In accordance with the principles of the present invention, the above and other objects are realized in one preferred taping apparatus embodiment that includes a film advancing assembly, two mutually disposed tape applicator mechanisms of conventional design, and a specially constructed platen assembly. With particular reference to the latter assembly, a platen forming a major portion thereof is constructed with two longitudinally disposed, offset segments that are positioned at different elevations (or levels) so as to define a film-receiving passageway therebetween. By also being mounted on an associated film-guiding support bed for retractable movement in the longitudinal direction, the platen segments can be rapidly positioned, in succession, into alignment with the respectively associated opposite film-side tape applicator mechanisms.

Such a composite taping apparatus, as uniquely assembled, is thus seen to be particularly adapted for use in applying a different transversely oriented tape to each side of an indexably advanced plastic film, during each dwell period of the latter. Moreover, as a result of the permanently aligned relationship between the tape applicator mechanisms, each successive pair of opposite side tapes is always precisely aligned, regardless of any spacing variations that could possibly occur between successively adjacent taping sites, determined solely by the degree of control over film advancement.

DETAILED DESCRIPTION OF THE INVENTION

It should be appreciated that while the invention is described in detail herein primarily in regard to a taping application performed on a rapidly indexed plastic film, which is subsequently employed in one particular type of flat under-carpet cable, the platen assembly incorporated in the composite apparatus is applicable for use in many other strip stock processing applications, wherein the strip stock is of a type that is not self-supporting, and wherein diverse force-induced work functions, such as surface machining, drilling or punching, or article attachment through welding or bonding, must be performed on opposite sides of the strip stock with appropriate instrumentalities.

Figures 1, 2:
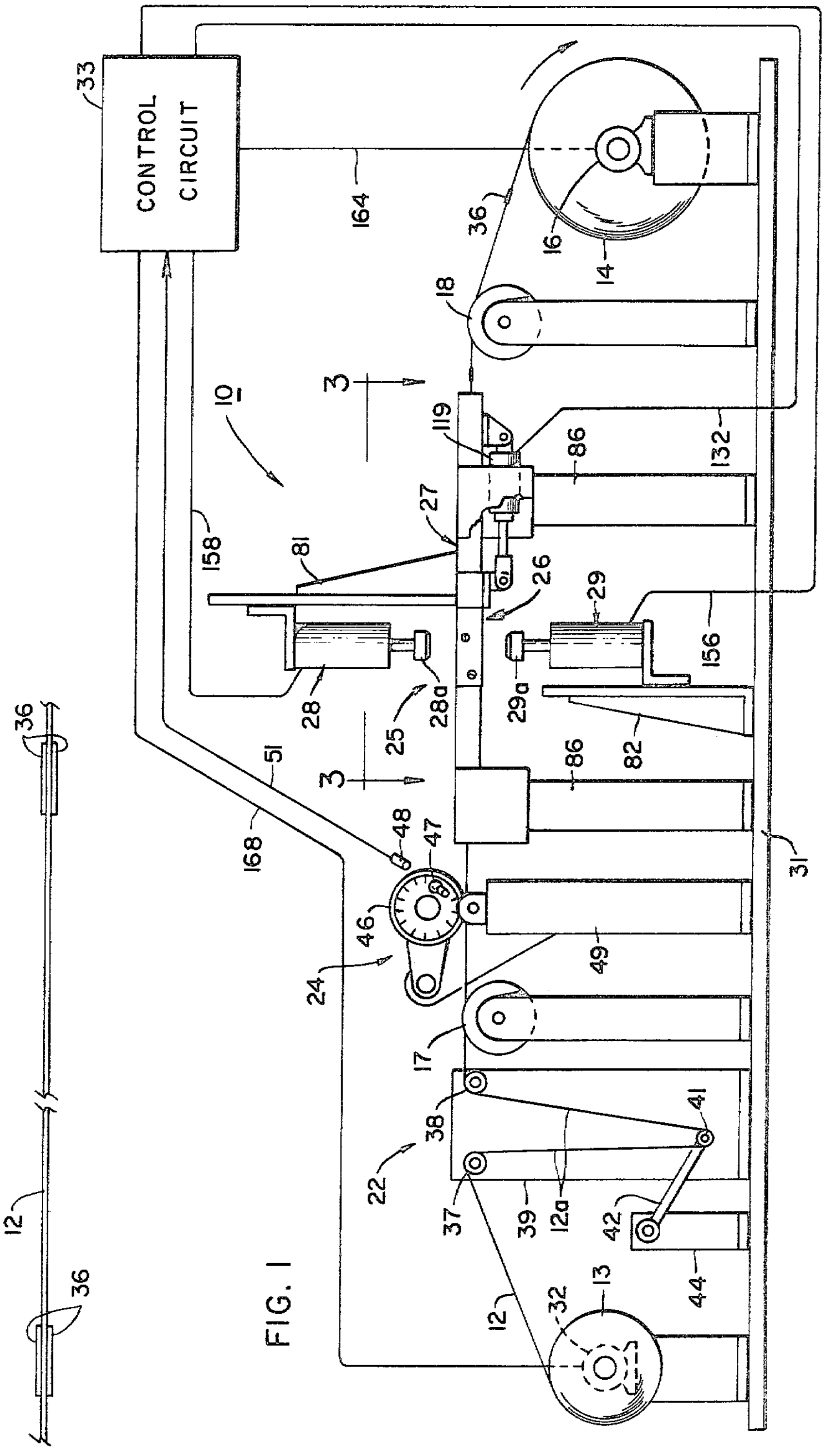
FIG. 1 is a schematic illustration of a film taping apparatus utilizing two mutually disposed tape applicator mechanisms, and a specially constructed platen assembly associated therewith, embodying the principles of the present invention.
FIG. 2 is a fragmentary, side elevational view of a length of plastic film having a spaced array of aligned pairs of oposite side tapes secured thereto in accordance with the apparatus of FIG. 1.

With reference first to FIG. 1, there is shown a composite film taping apparatus 10 which is particularly adapted to indexably advance an elongated supply of plastic film 12 along an essentially longitudinally defined path between a pay-off supply reel 13 and a take-up reel 14, the latter being incrementally driven by a suitably controlled drive motor 16 (shown only schematically) coupled thereto. In passing between the pay-off and take-up reels, the film 12 is advanced over a spaced pair of guide rollers 17 and 18, and therebetween successively through a film tension sensing and adjusting station 22, an optical encoder station 24, and a taping station 25. The latter station includes a unique platen assembly 26, mounted on a longitudinally disposed U-shaped support bed 27, and two mutually disposed tape applicator mechanisms 28 and 29, all considered in greater detail hereinbelow. The composite apparatus 10 is mounted on a common support member (or floor) 31. The drive motor 16, as well as an optional dynamic brake (or brake-functioning motor) 32, shown only in phantom coupled to the pay-off reel 13, is (or are) operated in response to signals supplied from a control circuit 33, also considered in greater detail hereinbelow.

At this point it will suffice to simply state that the composite apparatus 10, as constructed, has particular application in securing an array of spaced plastic tapes 36 on each side of the film 12, in opposite side aligned pairs, as depicted in FIG. 2. Such a processed film, as previously noted, is employed in the fabrication of one particular type of flat under-carpet cable disclosed in the aforementioned co-pending Elliott et al. application.

With specific reference now to the film tension sensing and adjusting station 22, it may take any one of a number of different forms, typically providing a variable, resiliently controlled film storage loop 12*a* to compensate for any sudden or abnormal changes in film tension. As illustrated, station 22 is comprised of two upper guide rollers 37, 38, rotatably mounted on a support plate 39, and a lower interposed drive roller 41. The latter roller is rotatably mounted on one end of a spring-biased dancer arm 42, the latter being pivotally mounted in a suitable manner to a support member 44. The spring (not shown) connected to the dancer arm 42 is chosen to exert a predetermined opposing force on the latter that allows the guide roller-defined film storage loop 12*a* to be shortened, or lengthened, depending on the degree of tension exerted on the film, relative to a predetermined nominal tension, at any given time during its incremental advancement. The largest variations in film tension will normally occur during the periods of rapid film acceleration, with the pay-off reel having a full or substantially full supply of film thereon.

The optical encoder station 24 includes a film-engaging code wheel 46 which, in conjunction with an optical light source 47 and a sensor 48 (both shown only symbolically), and all supported on a support member 49, results in the latter generating a train of encoded pulses, the number being indicative of the length of film advanced during each control circuit-defined index period. Such encoded pulses are fed over a line 51 to an input of the motor control circuit 33. With respect to a given code wheel 46, the number of pulses generated, as well as the rate at which they are generated, by the optical sensor 48, will depend, of course, on both the speed at which the film is advanced, and the predetermined spacing chosen between successive taping (or other work function) sites along the film.

Figure 3:
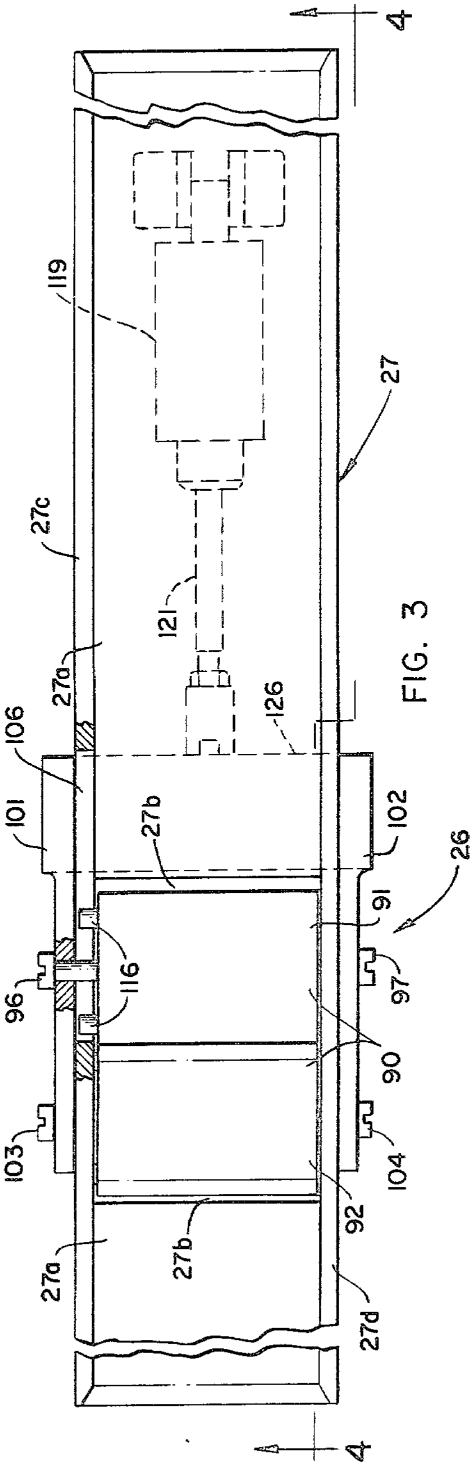
FIG. 3 is a fragmentary, detailed plan view, partially in section, of the U-shaped support bed and platen assembly mounted thereon as embodied in the apparatus of FIG. 1.
Figure 4:
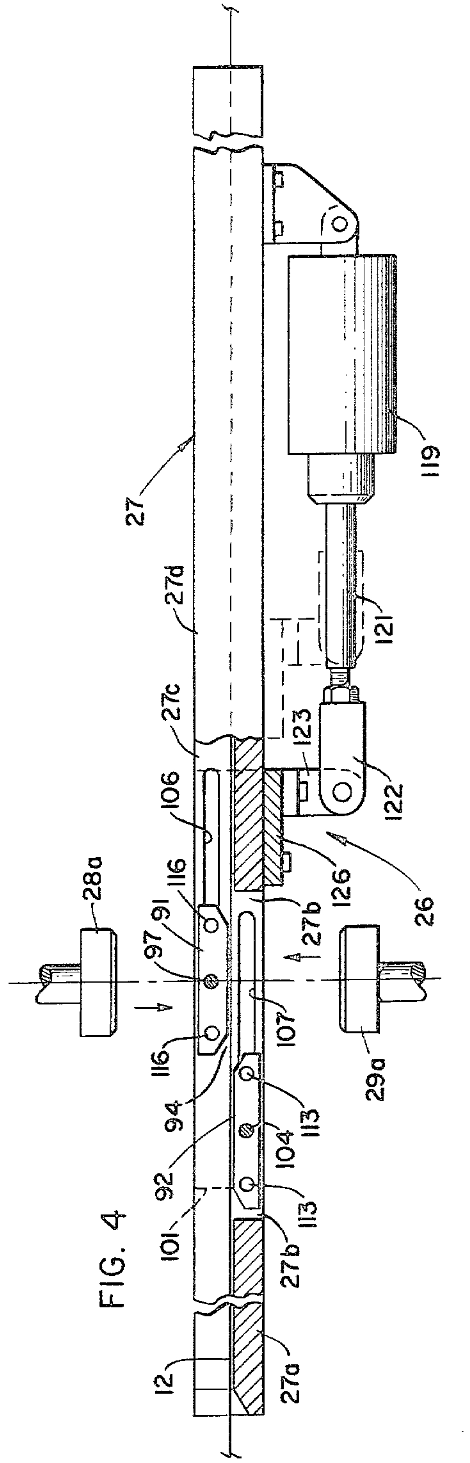
FIG. 4 is a fragmentary, detailed side elevational view, partially in section, of the support bed and platen assembly, taken along the line 4—4, of FIG. 3, showing the upper segment of the multi-level platen as interposed between the upper tape applicator mechanism and a film indexably advanced therepast, with the upper platen segment thus providing the necessary temporary solid backing for the opposite (lower) film side applicator mechanism.

With particular reference now to FIGS. 1, 3 and 4, the taping station 25 includes the two aforementioned mutually disposed tape applicator mechanisms 28, 29 and the interposed platen assembly 26, mounted on the U-shaped support bed 27. The tape applicator mechanisms are each secured to a separate support fixture 81 or 82, the former being suitably mounted at its base to the aforementioned U-shaped support bed 27, with the latter being mounted on a plurality of pedestals 86. The pedestals are affixed at their bases to the common support member (or floor) 31. As mounted, it is seen that the two tape applicator mechanisms 28, 29 are in precise, permanent alignment, and mutually disposed as a result of the lower fixture 82 being adapted to mount the associated tape applicator mechanism 29 upside down from its normally used position.

Figure 6:
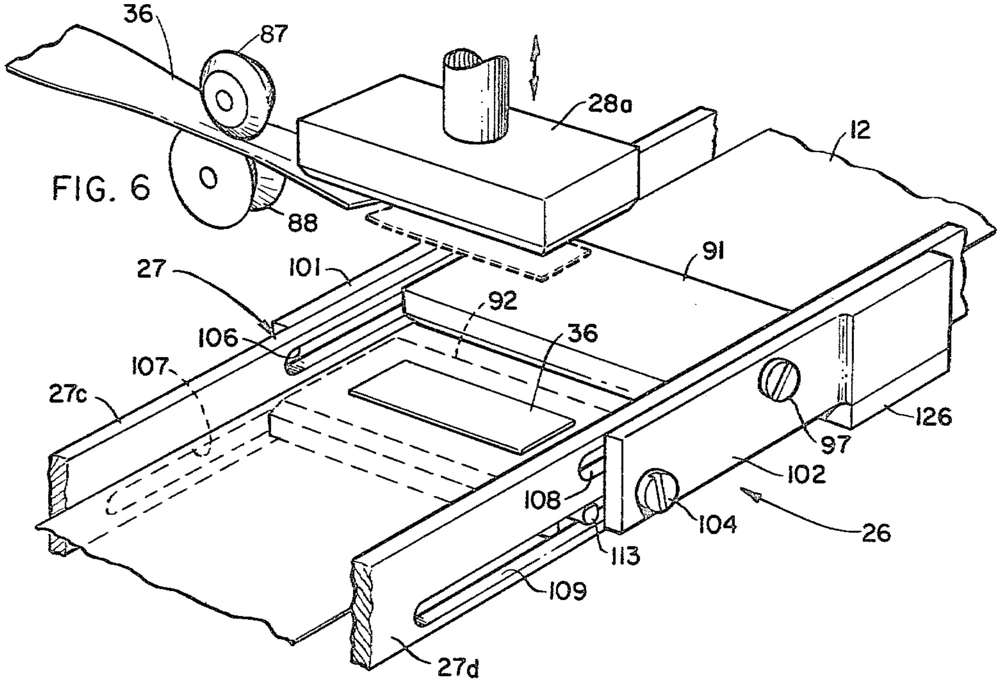
FIG. 6 is a fragmentary, detailed perspective view of the multi-level, retractable platen assembly of FIGS. 3–5, and more specifically illustrates the relative positions of the various elements thereof at a point in time immediately after a tape has been transversely secured to the top side of a plastic film which is being indexably advanced through the platen assembly in accordance with the principles of the present invention.

As the tape applicator mechanisms are of conventional, commercially available design, it will suffice to simply state that they are each adapted with an outwardly extending, retractable tape applicator pressure pad 28*a* or 29*a*, for securing a predetermined length of tape 36 (see FIGS. 2 and 6) to the adjacent side of the film 12 while momentarily stopped. This is accomplished by each tape applicator mechanism having both a drive spindle (not shown) for incrementally advancing a supply of tape, and an associated cutter assembly (not shown) to automatically sever a predetermined free-end length of the tape after it has been fed to a position adjacent to, and co-extensive with, any desired length-dimension portion of the outer face of the associated tape-applying pressure pad while in its retracted position, as depicted in FIG. 6.

To that end, each successively advanced free end portion of the tape 36, to be severed, is fed through a pair of pinch rollers 87, 88 (shown only in FIG. 6) which form that portion of the tape into an initial V-shape in cross-section. As such, the free end portion of the tape will have greater rigidity while momentarily suspended in a cantilevered manner adjacent the associated pressure pad, prior to being severed by the cutter blade (not shown). Essentially simultaneously with the severing operation, the free end of the tape is drawn against the associated pressure pad, such as pad 28*a* in FIG. 6, by vacuum, prior to that pad being moved downwardly so as to secure the tape to the film 12.

As employed in carrying out the taping function of primary concern herein, the pressure pads 28*a*, 29*a* of the two tape applicator mechanisms are oriented such that the longest dimension of each pad extends transversely of the film 12 as indexably advanced therebetween. As a result, the longest dimension of each strip of plastic tape 36 (see FIGS. 2 and 6), such as of polyester plastic, is likewise positioned transversely of the film 12. When such tapes have an adhesive backing thereon, they may be permanently or lightly bonded to the film 12, as desired. One preferred type of tape applicator mechanism for performing the taping operation of primary concern herein is sold by the 3M Company, under Model No. S-625.

With particular reference now to the platen assembly 26, it is mounted on the longitudinally disposed U-shaped support bed 27, as best seen in FIGS. 3–6. The platen assembly includes a composite retractable platen 90 comprised of two longitudinally disposed and offset platen segments 91, 92 positioned at different horizontal elevations so as to form a film-receiving slot or passageway 94 therebetween. The defined passageway lies in the same plane as the base 27*a* of the U-shaped support bed 27. The two segments of the platen are also dimensioned such that the planar surfaces thereof, when positioned as depicted in FIGS. 3 and 4, at least substantially enclose an intermediate, longitudinally disposed opening 27*b* formed in the base of the support bed 27.

Figure 5:
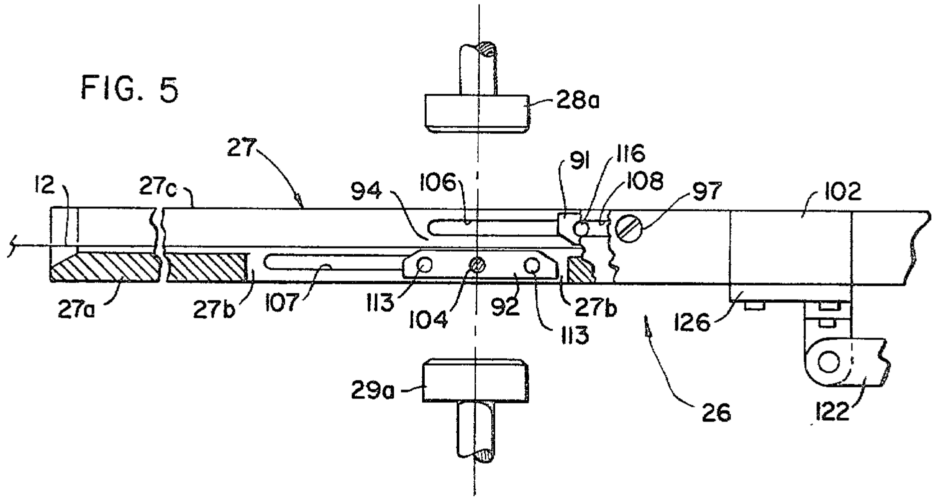
FIG. 5 is a fragmentary, detailed side elevational view, partially in section, of the support bed and platen assembly, showing the lower segment of the multi-level platen as interposed between the lower tape applicator mechanism and an indexably advanced film so as to function as a temporary solid backing for the opposite (upper) film side applicator mechanism.

The upper platen segment 91, as best seen in FIGS. 4–6, is secured at opposite ends through different threaded fastening members 96, 97 to respectively adjacent ones of a pair of mutually disposed, retractable side plates 101, 102. Similarly, the lower platen segment 92 is secured at opposite ends through separate threaded fastening members 103, 104 to the respectively adjacent side plates 101, 102.

As illustrated, the side plates 101, 102, and platen segments 91, 92 are retractably mounted on the support bed 27 as a result of the common-side fastening members 96 and 103 extending through respectively associated longitudinally disposed slots 106, 107, formed in a sidewall 27*c* of the U-shaped support bed 27, and the fastening members 97 and 104 extending through similar respectively associated slots 108, 109, formed in a sidewall 27*d* of the support bed. In order to insure permanent horizontal positioning of the upper and lower platen segments 91 and 92, each segment has two pairs of pins 113 (only one pair seen) or 116 respectively protruding a sufficient distance outwardly from the opposite ends thereof so as to also be key-way guided along the associated one of the support bed slots 107 or 108. Such pins are preferably secured within receiving bores formed in the ends of the platen segments, as illustrated, but may also be welded or otherwise secured thereto.

The mutually disposed support bed sidewall slots 107 and 108 are longitudinally dimensioned so as to allow the retractable displacement of the platen segments 91 and 92, in succession, into alignment with the respectively associated opposite film-side tape applicator mechanisms 28 and 29. Such selective positioning of the platen segments is best seen by examining the positions thereof relative to the respectively associated tape applicator mechanism pressure pads 28*a* and 29*a* illustrated in FIGS. 4 and 5. In this connection, it will be recalled that the reason for having to successively, rather than simultaneously, secure the tapes 36 forming each aligned pair to the film is that each tape applicator mechanism, when actuated, requires a firm, solid backing, such as in the form of a platen, positioned immediately adjacent the opposite side of the film.

The necessary retractable displacement of the segmented platen 90 is effected with a spring-returned pneumatic cylinder 119, the piston 121 of which is secured through an adjustably threaded bracket 122 to a mating bracket 123 mounted on a cross member 126, all forming part of the platen assembly 26. The pneumatic cylinder 119 is operated in timed sequence relative to the actuation of the tape applicator mechanisms, preferably under the control of the common control circuit 33, shown connected thereto over a line 132. With the pneumatic cylinder thus controlled, it is seen that the platen segments 91 and 92 are successively brought into alignment with the respectively associated tape applicator mechanisms before the latter are sequentially actuated.

It is to be understood, of course, that the pneumatic cylinder 119 could also be of the double acting type, and in either case be sequentially operated in accordance with many other types of conventional control circuitry. Moreover, the pneumatic cylinder could be replaced with many other types of power sources, such as by a servomotor driving a lead screw, or a rack and pinion, coupled to the platen, and accomplish the same beneficial end results. Concomitantly, the two platen segments could also be independently mounted and driven relative to each other and the support bed, if desired.

Figure 7:
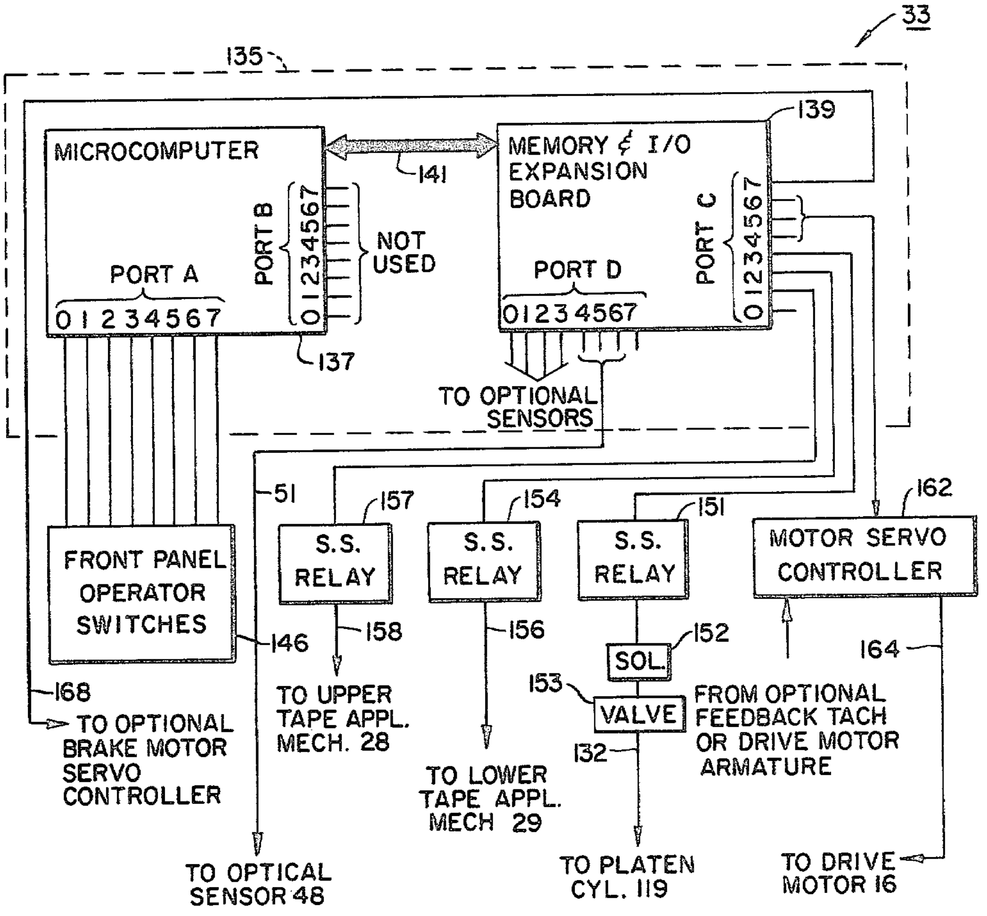
FIG. 7 is an illustrative schematic circuit diagram of the control circuit shown only in single block diagram form in FIG. 1.

With respect to the control circuit 33, it may take any one of a number of different forms. In the illustrative embodiment thereof depicted in FIG. 7, the control circuit includes a digital controller 135, identified within the dash-lined box. The controller includes a microcomputer 137 and an associated memory and I/O expansion board 139, interconnected via a plurality of address, data and control lines represented only generally by a bidirectional channel 141. The microcomputer 137 may be of any conventional type, as may the associated memory and expansion board 139, but in the illustrative circuit embodiment the microcomputer is one sold under the tradename KIM-1, by the MOS Technology Company, Inc., and the expansion board 139 is one sold under the tradename Memory Plus, by the Computerist Co., Inc.

As employed in combination, there are four 8-bit input/output (I/O) ports available, two in the microcomputer 137, designated as ports A and B (the latter not used), and two in the memory and I/O expansion board 139, designated as ports C and D.

In using such conventional digital logic circuitry, it is well known in the art that all of the I/O ports are memory mapped and, hence, any line of any port can be configured (programmed through conventional software) to be either an input or an output line. When any line of a port is configured to be an input, it can be examined by the microcomputer, in accordance with programmed software instructions, to determine its binary logic state. Conversely, when any line of a port is configured to be an output, it can be controlled, with respect to its binary logic state, by the microcomputer, again in accordance with programmed software instructions.

With particular reference now to the logic functions of the composite digital controller 135, all of the lines 0–7 of port A in the microcomputer 137 are programmed to be inputs during program initialization, and are connected to a front panel 146 comprised of a plurality of operator switches. These switches, when selectively actuated, are employed to initiate such microcomputer-controlled operating functions as: advance film forward or backward; advance film automatically; actuate upper or lower tape mechanisms; displace platen forward or backward, stop any or all operations, et cetera. For the illustrative application involved herein, port B of the microcomputer, as previously noted, is not used.

With respect to the memory and I/O expansion board 139, all of the lines 0–7 of port C are configured to be outputs during program initialization. Lines 1–7 of that port (line 0 not being used) are selectively employed singly or in multiple combinations to generate outputs that effect the desired programmed sequential operation of the drive motor 16, tape applicator mechanism 28, 29 and retractable platen 90.

All of the lines 0–7 of port D of the expansion board 139 are configured during program initialization to be inputs. While only input lines 4–6 of port D, as bracketed, are indicated as being utilized, specifically, to receive pulsed data over representative lead 51 from the optical encoder sensor 48 (shown only symbolically in FIG. 1), input lines 0–3 are shown, as a group, as being optionally available selectively, as would input line 7, for use in sensing the operating state of diverse types of sensors associated with the present or any other apparatus. Such optional sensors (not shown), could be employed, by way of example, to provide an indication to the composite controller 135 that the tape supply of either tape applicator mechanism had been depleted, or that the supply of film 12 on the supply reel 13 had been depleted, or that the platen 90 had not been fully displaced to either the desired forward of rearward position within a given period of time.

In connection with the optical encoder sensor station 24, while only one sensor 48 has been illustrated symbolically, in practice, it is often desirable to utilize a commercially available composite encoder assembly which includes a code wheel with multiple code tracks, such as three, and a similar number of respectively associated sensors. Such an optical encoder is capable of providing both finely graduated and single revolution code wheel data, as well as the direction of such rotation. For that reason, the single lead 51 and optical encoder sensor 48 are understood to be only representative, as evidenced by the association therewith of the three aforementioned bracketed input lines 4–6 of port D.

In a typical operating application, an operator would normally select a given length of film to be advanced during each index period by actuating appropriate film-length setting dials or operator switch(s) on the front panel 146. As a result, the chosen length of film to be advanced, represented by a predetermined pulse count, and which may be readily displayed in a programmed digital manner, is then software-loaded into a programmable counter (not shown) incorporated in the memory and I/O expansion board 139. Upon the initiation of film advancement, either in response to actuation of an operator start switch, or automatically under the control of the microcomputer 137, the loaded programmable counter is decremented in direct response to the input pulses applied thereto from the optical encoder sensor(s) 48 through one (or more) of the associated input lines 4–6 of port D.

Upon the microcomputer 137 sensing that the programmable counter in the memory and I/O expansion board 139 has decremented to 0, it effects the generation of a motor control signal on one (or more) output lines of port C which is (or are) directed to a motor servo controller 162. The latter controller may be of any conventional type, and when employed for use with a printed circuit drive motor, may advantageously include a power amplifier of the switching class D type.

In practice, it may often be desirable to initiate the slowdown of the drive motor 16 at some predetermined time prior to both the complete advancement of the film 12, and the de-energization of the motor, so as to have more precise control over consistently stopping the film at the desired taping (or other work function) points spaced therealong. To that end, output lines 4–6 of port C are shown bracketed together to illustrate that a plurality of inputs may be preferably applied to the motor servo controller 162 in a programmed, sequential manner. Such multiple inputs may effect programmed fast, slow, stop and reverse modes of motor operation, by way of example.

Upon the film 12 being stopped, the composite controller 135 generates a control signal at output line 3 of port C which is directed to, and energizes, a solid state relay 151. The latter relay, when energized, operates a solenoid 152 which, in turn, actuates a valve 153 connected over the aforementioned line 132 to the platen pneumatic cylinder 119 (see FIGS. 1 and 4). Actuation of the cylinder 119 effects the displacement of the platen 90 to the left, as viewed in FIG. 4, so as to position the upper platen segment 91 in alignment with the lower tape applicator pressure pad *29a*.

Thereafter, under the programmed control of the composite controller 135, a signal is generated on output line 2 of port C which energizes a solid state relay 154. The latter, when energized, causes a control signal to be applied to the lower tape applicator mechanism 29 over a line 156 to effect the advancement, severing and transverse positioning of a strip of tape 36 on the bottom side of the momentarily stopped film 12.

After a programmed delay, the output signal previously appearing on line 3 of port C is removed so as to effect the retraction of the platen 90 to the position depicted in FIGS. 5 and 6, whereat the lower platen segment 92 is then aligned with the upper tape applicator mechanism 28. Again after a programmed delay, the upper tape applicator mechanism is actuated, in response to a programmed control signal generated on output line 1 of port C. This signal is directed to and effects the energization of a solid state relay 157 which, in turn, causes a control signal to be applied to the upper tape applicator mechanism 28, over a line 158, to effect the advancement, severing and transverse positioning of a strip of tape 36 (see FIG. 6) this time on the upper side of the momentarily stopped film 12. After another programmed delay, the appropriate motor control signal is generated on a predetermined one of the aforementioned output lines 4–6 of port C to initiate the energization of the drive motor 16 and, thereby, start the next indexed advancement of the film 12.

As previously noted in connection with the description of the composite apparatus 10, an optional passive or dynamic brake 32, such as in the form of another printed circuit motor (shown in phantom) could be readily coupled to the pay-off reel 13 to further facilitate control over film tension, as well as rapid stopping of the film. When dynamic motor braking is desired, for example, the composite logic controller 135 can be readily programmed in a known manner to provide an output signal, such as on line 7 of port C (or several sequential signals on different lines, such as of port B), that can be directed over a lead 168 (or multiple leads) to an optional brake motor servo controller (not shown). Of course, a signal line control signal could also be readily applied through a solid state relay (not shown) to effect the energization of a conventional dynamic brake in a single, programmed on-off manner. For more refined control over film tension, any servo controller employed with an optional dynamic braking motor could also include an optional feed-back loop that is responsive to the angular position of the dancer arm 42, in a well known manner. In that case, the position of the dancer arm would provide a potentiometer-type of analog feedback control signal that would allow the braking motor to more closely track the instantaneous speed of the drive motor 16 and, thus, provide more responsive and uniform control over film tension.

Figure 8:
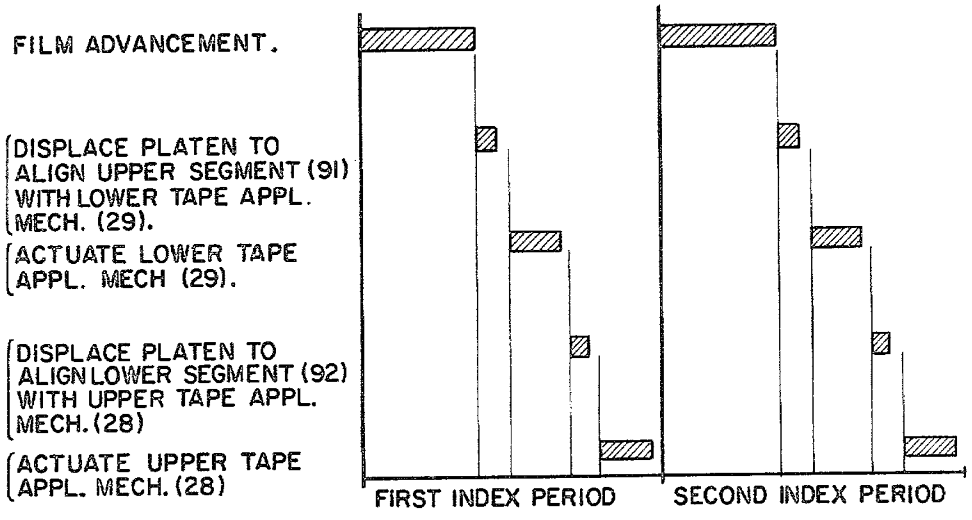
FIG. 8 is an illustrative timing diagram showing the sequential mode of operation of the taping apparatus of FIG. 1.

FIG. 8 is a timing chart illustrating the timed sequences during which the film 16 is advanced, the tape applicator mechanisms 28 and 29 successively operated, and the platen 90 successively displaced to the two desired positions therefor, as carried out in accordance with the above-described programmed mode of operation of the composite control circuit 33 and, in particular, the digital controller 35.

It is readily apparent, of course, that all of the logic control functions carried out by the illustrative control circuit 33 could be similarly performed, with any desired degree of precision, through the use of many other types of logic devices and/or circuit arrangements which need not be operated under the control of a programmed microcomputer, unless desired. For some of such other conventional types of motor control circuits, as well as composite drive systems, applicable for use in rapidly indexing strip stock, such as in the form of a plastic film, reference is made to a book entitled "Electronic Motor Control", by Allan Lytel, published by Howard W. Sams and Co., Inc. (1964).

From the foregoing, it is seen that the taping station 25 incorporates two mutually disposed tape applicator mechanisms and a uniquely constructed platen assembly 26 that includes a multi-level, segmented and retractable platen 90.

Such a platen assembly allows each segment of the platen, such as the upper one 91, best illustrated in FIG. 4, to be rapidly brought into alignment with the associated lower tape applicator mechanism 29, immediately prior to the latter being actuated such that the then fully extended pressure pad *29a* thereof engages and positions a severed length of tape 36 transversely on the corresponding side of the momentarily stopped film 12, as illustrated in FIG. 6. With the two permanently aligned tape applicator mechanisms 91, 92 thus being sequentially actuated in timed relation with the positioning of the platen 90, each successive pair of top-side, bottom-side tapes secured to the indexably advanced film 12 will always be in precise alignment.

While a preferred taping apparatus, incorporating specially constructed sub-assemblies, has been disclosed herein, it is obvious that various modifications may be made to the present illustrative claimed embodiments of the invention, and that a number of alternative related embodiments could be devised by one skilled in the art without departing from the spirit and scope of the invention.

What is claimed is:

1. An apparatus for positioning an array of material strips at predetermined spaced intervals along each side of a supply of indexably advanced strip stock, with corresponding material strips in said two arrays being at least substantially co-extensive, said apparatus comprising:

means for indexably advancing a supply of strip stock along a longitudinally disposed path;

separate material strip applicator mechanisms positioned in mutually disposed and aligned relationship, and spaced apart a distance sufficient to normally allow strip stock to be advanced along said path therebetween, each of said applicator mechanisms being adapted, when actuated, to sever a predetermined length of strip material from a supply thereof, and position said several material strip on an adjacent side region of the strip stock each time the latter is momentarily stopped;

a strip stock support bed interposed between said mutually disposed material strip applicator mechanisms, the base of said support bed having an opening along an intermediate region thereof that allows both applicator mechanisms, when actuated, to contact an interposed section of strip stock;

a platen assembly mounted on said support bed, said assembly including a platen that is retractably mounted relative to said bed, and has two offset segments, each of the latter being positioned at a different elevation so as to define a strip stock-receiving passageway therebetween, said platen segments being adapted for longitudinal displacement relative to said support bed, while selectively at least partially enclosing said opening in the base of the latter, such that each segment in succession may be brought into alignment with the associated applicator mechanism positioned on the opposite side of a section of strip stock when advanced to a position therebetween and, thereby, provide a solid backing for said associated tape applicator mechanism, when actuated;

means for retractably displacing said platen segments, in succession, into alignment with the respectively associated tape applicator mechanisms, and circuit means for controlling the incremental advancement of a supply of strip stock along said path, and for sequentially actuating said tape applicator mechanisms in timed relation with the dwell periods of such strip stock, and the displacement of said platen segments successively into alignment with said respectively associated applicator mechanisms, so as to effect the successive positioning of corresponding material strips on opposite sides of such strip stock at each predetermined spaced interval therealong.

2. An apparatus in accordance with claim 1 wherein each of said applicator mechanisms is of the type adapted to sever, position and secure predetermined lengths of adhesive-backed tape to the adjacent side of a supply of indexably advanced strip stock, such as in the form of a thin film of plastic material, wherein said tape applicator mechanisms are precisely aligned and oriented relative both to each other and to an indexably advanced film so as to secure the corresponding severed lengths of tape to, and transversely of, the film in precise opposite side registration, and wherein said means for indexably advancing said film includes pay-off and take-up reels, with the latter having a drive motor coupled thereto, with said motor being controlled by said circuit means.

3. An apparatus in accordance with claim 1 wherein said support bed further includes slotted sidewall portions, with said retractable platen being adapted to be key-way guided therealong, wherein said platen segments are interconnected, and wherein said means for successively displacing each platen segment into alignment with the associated opposite film side applicator mechanism comprises a pneumatic power source, operated in response to an output signal from said circuit means.

4. An apparatus in accordance with claim 1 wherein said means for advancing a supply of strip stock in an indexable manner further includes strip stock tension sensing and adjusting means positioned along said path of travel therefor, and wherein said circuit means includes linear strip stock advancement measuring means for indicating when each successive predetermined length of such strip stock has been incrementally advanced past said aligned material strip applicator mechanisms, and for effecting the generation of a circuit means control signal which, in turn, responsively effects the stopping of such strip stock, after each successive measured advancement thereof, for a predetermined dwell period determined by said circuit means.

5. An apparatus in accordance with claim 2 wherein said support bed further includes slotted sidewall portions, with said retractable platen being adapted to be key-way guided therealong, wherein said platen segments are interconnected, and wherein said means for successively displacing each platen segment into alignment with the associated opposite film side applicator mechanism comprises a pneumatic power source, operated in response to an output signal from said control means.

6. An apparatus in accordance with claim 5 wherein said means for advancing a supply of film in an indexable manner further includes film tension sensing and adjusting means positioned along said path of travel therefor, and wherein said circuit means includes linear film advancement measuring means for indicating when each successive predetermined length of such film has been incrementally advanced past said aligned tape applicator mechanisms, and for effecting the generation of a circuit means control signal which, in turn, responsively effects the stopping of such film, after each successive advancement thereof, for a predetermined dwell period determined by said circuit means.

7. An apparatus in accordance with claim 4 wherein each of said applicator mechanisms is of the type adapted to sever, position and secure predetermined lengths of adhesive-backed tape to the adjacent side of a supply of indexably advanced strip stock, such as in the form of a thin film of plastic material, wherein said tape applicator mechanisms are precisely aligned and oriented relative both to each other and to an indexably advanced film so as to secure the corresponding severed lengths of tape to, and transversely of, the film in precise opposite side registration, and wherein said means for indexably advancing said film includes pay-off and take-up reels, with the latter having a drive motor coupled thereto, with said motor being controlled by said circuit means.

8. An apparatus for performing a work function on opposite sides of, and at each of a succession of predetermined spaced regions along strip stock while advanced along a predetermined path, and wherein each work function performed on one side of such strip stock requires an independent, temporary solid backing positioned immediately adjacent the other side of the strip stock, said apparatus comprising:

means for advancing a supply of strip stock along said predetermined path;

separate work-function instrumentalities positioned in mutually disposed relationship, and spaced apart a distance sufficient to normally allow strip stock to be advanced along said path therebetween, each of said instrumentalities being adapted, when actuated, to contact a section of strip stock when interposed between said instrumentalities and perform a work function on the adjacent side thereof;

a longitudinally disposed strip stock support bed interposed between said instrumentalities, the base of said support bed having an opening along an intermediate region thereof that allows both instrumentalities, when actuated, to contact an interposed section of strip stock;

a platen assembly mounted on said support bed, said assembly including a platen that is retractably mounted relative to said bed, and has two offset segments, each of the latter being positioned at a different elevation so as to define a strip stock-receiving passageway therebetween, said platen segments being adapted for longitudinal displacement relative to said support bed, while selectively at least partially enclosing said opening in the base of the latter, such that each segment in succession may be brought into alignment with the associated instrumentality positioned on the opposite side of a section of strip stock when advanced to a position therebetween and, thereby, provide a solid backing for said associated instrumentality when actuated, and means for retractably displacing said platen segments, in succession, into alignment with the respectively associated instrumentalities.

9. An apparatus in accordance with claim 8 wherein each of said work-function instrumentalities comprises a tape applicator mechanism of the type adapted to successively position material strips, in the form of predetermined lengths of tape, at said predetermined intervals along, and on the adjacent side of, a supply of strip stock when advanced therepast, and wherein said means for advancing the strip stock effects such advancement in an indexable manner.

10. An apparatus in accordance with claim 9 wherein said tape applicator mechanisms are positioned and oriented to apply discrete lengths of tape to opposite sides of an advanced supply of strip stock in a direction transverse to the longitudinal axis of the latter, with corresponding tapes on opposite sides of such strip stock being successively applied to the latter in aligned registration during each dwell period thereof, and wherein said platen assembly is key-way guided along sidewall portions of said support bed.

11. An apparatus in accordance with claim 10 wherein said means for advancing a supply of strip stock in an indexable manner further includes strip stock tension sensing and adjusting means positioned along said path of travel.

12. An apparatus in accordance with claim 8 further including circuit means for controlling the indexable advancement of a supply of strip stock along said predetermined path, and for sequentially actuating said work-function instrumentalities in timed relation with the retractable displacement of said platen segments successively into alignment with said respectively associated instrumentalities so as to allow said work functions to be successively performed on opposite side regions of such strip stock.

13. An apparatus in accordance with claim 12 wherein said support bed further includes slotted sidewall portions, and wherein said platen is adapted to be key-way guided therealong.

14. An apparatus in accordance with claim 11 further comprising circuit means for controlling the indexable advancement of a supply of strip stock along said predetermined path, and for sequentially actuating said tape applicator mechanisms in timed relation with the dwell periods of the strip stock, and the displacements of said platen segments successively into alignment with said respectively associated tape applicator mechanisms so as to effect the successive positioning of corresponding tapes on opposite sides of such strip stock at each predetermined spaced interval therealong.

15. An apparatus in accordance with claim 14 wherein said circuit means includes linear strip stock advancement measuring means for indicating when each successive predetermined length of such strip stock has been incrementally advanced past said aligned tape applicator mechanisms, and for effecting a circuit means control signal which, in turn, responsively effects the stopping of such strip stock after each successive measured advancement thereof, for a predetermined dwell period determined by said circuit means.

16. An apparatus in accordance with claim 8 wherein each of said work-function instrumentalities comprises a tape applicator mechanism of the type adapted, when actuated, to sever, position and secure predetermined lengths of adhesive-backed tape to the adjacent side of a supply of advanced strip stock, such as in the form of a thin film of plastic material, and wherein said tape applicator mechanisms are precisely aligned and oriented relative both to each other and to an advanced film so as to secure the corresponding severed lengths of tape to, and transversely of, the film in precise opposite side registration.

17. An apparatus in accordance with claim 16 wherein said means for advancing a supply of film effects such advancement in an indexable manner, and further includes film tension sensing and adjusting means positioned along said predetermined path, and wherein said support bed further includes slotted sidewall portions, with said platen being adapted to be keyway guiding therealong.

18. A platen assembly adapted to allow an instrumentality-generated work function to be successively performed on opposite sides of, and at each of a succession of predetermined spaced regions along strip stock while advanced along a predetermined path, and wherein each work function performed on one side of such strip stock requires an independent, temporary solid backing positioned immediately adjacent the other side of the strip stock, said platen assembly comprising:

a longitudinally disposed strip stock support bed adapted to be interposed between two mutually disposed instrumentalities for performing work functions on opposite sides of an advanced supply of strip stock, the base of said support bed having an opening along an intermediate region thereof that allows such instrumentalities, when selectively actuated, to contact an interposed section of such strip stock;

a platen assembly mounted on said support bed, said assembly including a platen that is retractably mounted relative to said bed, and has two offset platen segments, each of the latter being positioned at a different elevation so as to define a strip stock-receiving passageway therebetween, said platen segments being adapted for longitudinal displacement relative to said support bed, while selectively at least partially enclosing said opening in the base of the latter, such that each segment in succession may be brought into alignment with an associated work function instrumentality when positioned on the opposite side of a section of strip stock when advanced along said path to a position therebetween and, thereby, provide a solid backing for said associated work function instrumentality, when actuated, and means for retractably displacing said platen segments, in succession, into alignment with such respectively associated work function instrumentalities.

19. A platen assembly in accordance with claim 18 wherein said support bed further includes slotted sidewalls, with said retractable platen being adapted to be key-way guided therealong, wherein said platen segments are interconnected, and wherein said means for successively displacing the platen segments into respective positions allowing separate work functions to be performed on opposite sides of an advanced supply of strip stock comprises a pneumatically operated power source connected to said platen segments.

20. A platen assembly in accordance with claim 18 further including means for advancing a supply of strip stock through said passageway defined between said platen segments and parallel to the major mutually disposed surfaces thereof, and circuit means for controlling the displacement of said platen segments relative to the advancement of a supply of strip stock therebetween.

* * * * *